(12) United States Patent
Groarke et al.

(10) Patent No.: US 7,966,281 B2
(45) Date of Patent: Jun. 21, 2011

(54) MANAGEMENT OF STORAGE AND RETRIEVAL OF DATA LABELS IN RANDOM ACCESS MEMORY

(75) Inventors: Vincent Groarke, Cork (IE); Anne Geraldine O'Connell, Cork (IE)

(73) Assignee: Broadcom Corporation, Irvine, CA (US)

( * ) Notice: Subject to any disclaimer, the term of this patent is extended or adjusted under 35 U.S.C. 154(b) by 230 days.

(21) Appl. No.: 12/434,350

(22) Filed: May 1, 2009

(65) Prior Publication Data

US 2010/0063983 A1 Mar. 11, 2010

(51) Int. Cl.
*G06F 15/00* (2006.01)
(52) U.S. Cl. .............. 706/62; 706/45; 706/46; 706/50; 706/53; 709/201; 709/223; 709/227; 709/238; 370/351; 370/360; 370/384; 370/389; 370/392; 370/395.31
(58) Field of Classification Search ............... None
See application file for complete search history.

(56) References Cited

U.S. PATENT DOCUMENTS

| | | | | |
|---|---|---|---|---|
| 6,163,541 A | * | 12/2000 | Casey et al. | 370/395.51 |
| 6,601,101 B1 | * | 7/2003 | Lee et al. | 709/227 |
| 6,922,410 B1 | * | 7/2005 | O'Connell | 370/401 |
| 2003/0210686 A1 | * | 11/2003 | Terrell et al. | 370/389 |
| 2006/0221956 A1 | * | 10/2006 | Narayan et al. | 370/389 |
| 2008/0084866 A1 | * | 4/2008 | Johnson et al. | 370/351 |
| 2008/0253370 A1 | * | 10/2008 | Cremin et al. | 370/390 |

OTHER PUBLICATIONS

Wang et al., "A fast Table Update Scheme for High-Performance IP Forwarding", Journal of High Speed Networks, vol. 13, issue 3, 2004, pp. 592-597.*
Hong et al., "Scalable Ad Hoc Routing in Large, Dense Wireless Networks Using Clustering and Landmarks", Proceedings of ICC 2002, New York City, New York, Apr. 2002, pp. 3179-3185.*
Saini et al., "Implementation and comparison of clustering techniques in wireless routing protocols", 2nd IEEE International Conference on Computer Science and Information Technology, 2009, pp. 159-162.*
Huang et al. "Hybrid Routing Protocol Based on the k-hop Clustering Structure for MANETs", Second International Conference on Intelligent Networks and Intelligent Systems, 2009, pp. 197-200.*

* cited by examiner

*Primary Examiner* — Omar F Fernandez Rivas
(74) *Attorney, Agent, or Firm* — Brake Hughes Bellermann LLP

(57) ABSTRACT

According to an example embodiment, a technique may be provided for managing a label data base of which each entry comprises a data field for insertion into a respective packet in a multicast transmission and a validity field. The technique may include, for example, (a) establishing a fixed size for a cluster of labels, (b) associating with each cluster a pointer to another cluster, (c) establishing a sentinel cluster of which all entries are indicated to be invalid and of which the cluster pointer points to this sentinel cluster, (d) establishing a root table which defines the number of replications of the packet in a multicast group and identifies a first label cluster associated with the multicast group and (e) establishing a chain of clusters of which each cluster which is full of valid entries points to the next cluster in the chain and the last cluster which contains valid entries points to the sentinel cluster.

7 Claims, 15 Drawing Sheets

MANAGEMENT OF STORAGE AND RETRIEVAL OF DATA LABELS IN RANDOM ACCESS MEMORY

CROSS-REFERENCE TO RELATED APPLICATIONS

This application claims priority under 35 U.S.C. 365 to Great Britain Application Ser. No. GB0807991.5, filed on May 2, 2008, entitled "MANAGEMENT OF STORAGE AND RETRIEVAL OF DATA LABELS IN RANDOM ACCESS MEMORY", herein incorporated by reference.

FIELD

The example embodiments relate to the management of storage and retrieval of data labels in random access memory.

BACKGROUND

It is customary in the processing of data packets and particularly packets such as multicast packets which require replication, such as in a VPLS (virtual private LAN service), to store a payload of an incoming packet and to perform processing principally on a dataset (termed a 'control entry') while the payload of the packet is stored in memory. After replication a multiplicity of packets for dispatch are reconstituted from the derived control entries and the payload. The reconstitution usually requires the appending of different values of a particular data field (such as a header field) to the various packets and values of these fields for the various packets are termed 'labels'.

'Label memory' is the name given to a particular region of memory employed for the storage of such 'labels'. It is convenient though not always essential for the label memory to be external to the main processing 'chip'. The smallest logical unit stored in label memory is a label. A label comprises data bits; one or more (but usually only one) of these data bits is a validity field that indicates whether the rest of the data in the label is valid.

In a label memory, labels are preferably grouped together into 'label clusters'. Each such label cluster contains a multiplicity (N) of labels, which are very preferably stored in consecutive address locations in the label memory. Label clusters can be linked together into 'label chains', such that each label chain contains at least one but usually more than one label cluster.

Each label chain may be associated with a 'pseudo wire', i.e. a 'logical' wire between a minimum of two endpoints. In order to transmit a packet to the endpoints on a 'pseudo wire', each label in the associated label chain is read and a separate packet per valid label in the label chain is transmitted, the data in each label being used to construct the respective packet. In practice the transport from one endpoint to another includes the use of a transport label (different from the 'pseudo-wire' label) which is also prepended to the packet and defines the path for the next 'hop'. At that hop the transport label is removed and replaced by another transport label which defines the path to the next hop. The pseudo-wire label is always the innermost label in the hierarchy of labels prepended. At each hop, the pseudo-wire label is also examined and if that hop is configured with it, the pseudowire is 'terminated' in that hop. At that stage normal layer 2 bridging lookups may be performed to determine an output port as usual.

Typically, a separate table, called herein the 'VPLS Root Table' contains an entry for each pseudo wire visible to the processor. Each entry in the VPLS Root Table may include three fields, namely (1) a validity bit; (2) a 'label count'; and (3) a pointer to the start of the label chain in label memory associated with this pseudo wire. An operating program, i.e. software can provide the functions required to create label chains and also to add labels to or to remove labels from a label chain.

There are constraints on the software in implementing these add and remove functions. These constraints generally arise as consequences of the operation of the associated hardware. In particular, although (necessarily) an invalid label may appear (logically) between two valid Labels in a label chain, particularly during a process of removal, once a label has been removed there should not be a gap between labels in the label chain. Duplication of labels should not exist at any time in a label chain. All labels not being removed from a label chain should be present in the label chain. The two latter constraints mean that the labels may not themselves define duplicate packets and must not cause discard of a packet.

It is desirable to provide a technique for the efficient addition of labels to, and the removal of labels from, a label chain. In particular one requires a technique in which the constraints noted above are fulfilled, the usage of memory required to remove a label is minimal and 'in-flight references' to label chains are managed properly.

SUMMARY

The example embodiments may include, for example, a method of managing a label data base of which each entry comprises a data field for insertion into a respective packet in a multicast transmission and a validity field. The example method may include:

(a) establishing a fixed size (N) for a cluster of labels,
(b) associating with each cluster a pointer to another cluster
(c) establishing a sentinel cluster of which all entries are indicated to be invalid and of which the cluster pointer points to this sentinel cluster
(d) establishing a root table which defines the number of replications of the packet in a multicast group and identifies a first label cluster associated with the multicast group; and
(e) establishing a chain of clusters of which each cluster which is full of valid entries points to the next cluster in the chain and the last cluster which contains valid entries points to the sentinel cluster.

This method facilitates the addition and removal of labels in an efficient manner fulfilling the aforementioned constraints.

In particular, the addition of a new label when said last cluster in the chain is full of valid entries may now comprise establishing a new label cluster with the new label as its first entry, and changing the cluster pointer for said last cluster to point to the said new cluster. The removal of a given label from within a specified cluster may now be performed by copying all the entries which are to be retained from said specified cluster and all subsequent clusters into a new chain of clusters in which all the clusters with the possible exception of the last cluster in the new chain are full of valid entries in order and setting the cluster's pointers so as to substitute this new chain in place of said specified and said subsequent clusters.

DETAILED DESCRIPTION

According to an example embodiment, a technique may be provided for managing a label data base of which each entry comprises a data field for insertion into a respective packet in a multicast transmission and a validity field comprises (a) establishing a fixed size for a cluster of labels, (b) associating with each cluster a pointer to another cluster, (c) establishing a sentinel cluster of which all entries are indicated to be invalid and of which the cluster pointer points to this sentinel cluster, (d) establishing a root table which defines the number of replications of the packet in a multicast group and identifies a first label cluster associated with the multicast group and (e) establishing a chain of clusters of which each cluster which is full of valid entries points to the next cluster in the chain and the last cluster which contains valid entries points to the sentinel cluster.

The addition of a new label when the last cluster in the chain is full of valid entries may comprise establishing a new label cluster with the new label as its first entry, and changing the cluster pointer for the last cluster to point to the new cluster. The removal of a given label from within a specified cluster may comprise copying all the entries which are to be retained from the specified cluster and all subsequent clusters into a new chain of clusters in which all the clusters with the possible exception of the last cluster in the new chain are full of valid entries in order and setting the cluster's pointers so as to substitute this new chain in place of the specified and subsequent clusters. Further details will now be described.

Figure 15:
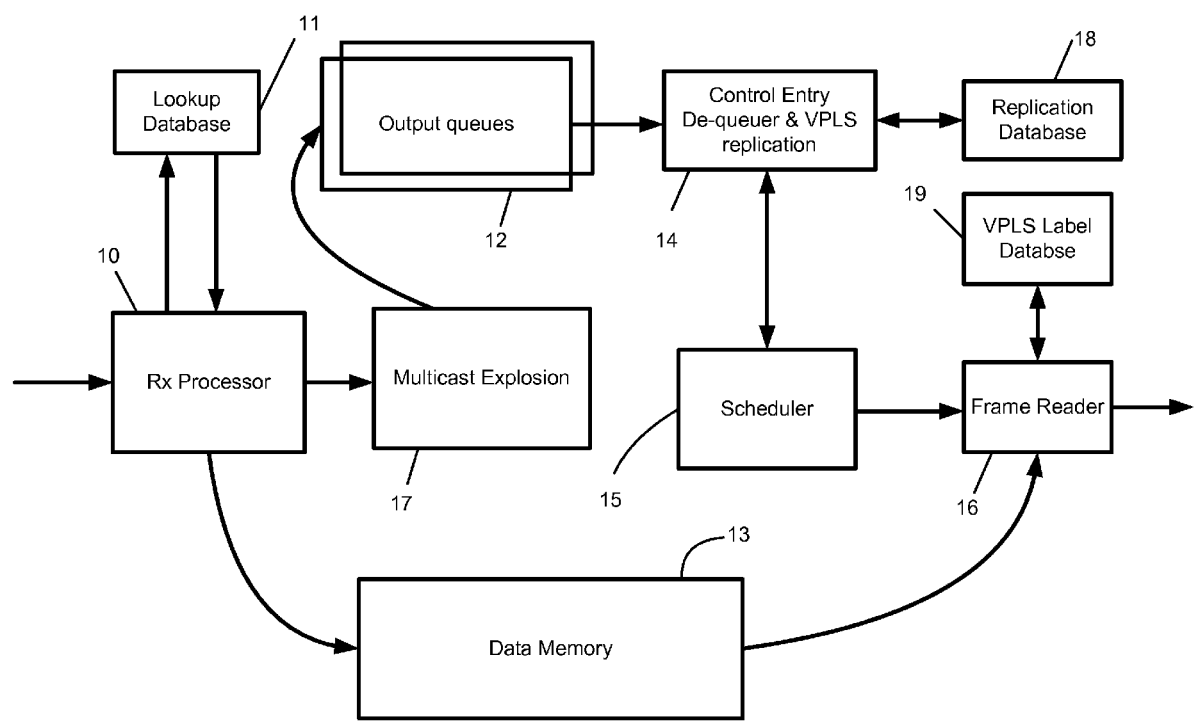
FIG. 15 illustrates by way of example only schematically part of a processor including a label memory.

It may be convenient to describe first the processing performed by the processor partly illustrated in FIG. 15 in order to set by way of example a context for the various example embodiments, which may include a system in which a label database may be employed.

One example of a network device as employed in a packet-switched network is shown in FIG. 15. Such a device may in general have a multiplicity of ports for receiving packets from, and forwarding packets to, an external network in accordance with any of a variety of transmission protocols. For simplicity FIG. 15 shows only one source port and one destination port.

Each packet may include a header and a payload. The header includes the destination address, the source address, the packet type and information from which, among other things, the priority can be ascertained. The packet may conform to any of known protocols. When the packet is received it is processed. This may be a complex operation but for the present purposes it is sufficient to state that the processing, denoted by packet processing stage 10, includes a lookup in a database 11 to obtain forwarding data for the packet. The packet is preferably temporarily stored in data memory 13. The processing obtains a control entry, which is a data set derived from the header and is used to control the flow of the packet through the device. The control entry (or data set) normally includes destination information, which is derived from the network address information during the lookup, protocol identifiers, an identification of the destination port (in the case of a unicast packet) and an address pointer which indicates where the packet is stored in the data memory 13. The control entry is placed on one of the queues 12 defined in control memory. Control entries are selected or de-queued from the control memory by a de-queuer 14 under the control of a scheduler 15. Typically this selects control entries from the output queues in turn for a given port by means of a weighted round robin algorithm. A selected control entry is used by the frame reader to retrieve the respective packet segments from data memory, make such changes (particularly to the header) as may be necessary and reconstitute the packet for dispatch from the respective port.

There are multiple output queues per port, usually for different types of traffic. It is customary to allocate 'bandwidth' to each queue for a port. The scheduling algorithm is used to allocate bandwidth among the queues for a port. If (just for the sake of a simple example) there were four queues each allocated 25% of the bandwidth, the scheduling algorithm could be a simple round robin algorithm; but in practice a weighted algorithm or more complex or versatile algorithm may be used.

Packets received on an input port may be unicast packets or multicast packets. According to an example embodiment, a unicast packet may be regarded as a packet that will be sent to a single destination. Multicast packets may be regarded as packets that will be sent to more than one destination. A VPLS (virtual private LAN service) packet is a multicast packet that can be replicated multiple times on a single port or multiple output ports.

Interposed between the Rx Process stage 10 and the output queues is a stage 17 captioned 'Multicast Explosion'. Stage 17, which may be constituted by dedicated hardware or software or a combination of hardware and software, then decodes a flag (more particularly described in the aforementioned application) in the control entry. If this flag is 'clear', stage 17 uses a special field in the control entry to lookup a list of destinations and then copies the control entry into the relevant queue 12 for each of the destinations. These control entries may be regarded as 'secondary control entries', which generally resemble the primary control entry but will denote a unicast packet. These secondary control entries will contain the same address pointer for memory 13, so that the frame reader 16 will retrieve for each of them the same payload. These control entries are then written into separate output queues 12 for each of the destination ports. These entries are then scheduled for transmission according to a scheduling algorithm such as a deficit-weighted round robin algorithm. The scheduler 15 controls the de-queueing stage 14 to select the control entries from the queues for the port in accordance with the scheduling algorithm and the control entries are passed one at a time to the frame reader 16, which in accordance with the respective address pointer retrieves the respective payload from the data memory 13 and reconstitutes each unicast packet for dispatch from the respective port.

When a VPLS (Virtual private LAN Service) packet has been received it must be replicated either multiple times for a single destination port or multiple times for multiple destination ports. Different header labels must be attached with each replication. The control entry for this packet indicates that the packet is to be sent to a port or to multiple ports. Furthermore, the VPLS field indicates that the packet may be replicated on this port or these ports but does not (in this embodiment) indicate the number of replications required and does not contain the labels to be appended. The number and size of the labels to be appended are large and they have to be stored in a separate database. The replication takes place within the output de-queueing process. These labels are appended to the packets as the packets are being transmitted.

When a packet is received, it is parsed and a lookup of the forwarding database 11 is done. The lookup result indicates that the packet may require VPLS replication. A single control entry is generated for each port (which may be one or more) and this control entry is stored in the respective output queue. However, when the control entry is due for de-queuing, the VPLS field is used to access a replication database 18. If this database returns an indication that only one instance is required, the control entry is cleared for the queues and the packet is reconstituted as previously described. If however multiple replications are required, the de-queuer 14 will start a decrementing counter. An instance of the control entry will be passed to the frame reader 16 to reconstitute a unicast packet with the relevant header (modified as necessary) and the payload, but the control entry will remain at the head of its queue to await the next time that queue is selected according to the scheduling algorithm. This sub-process is repeated until all the replications have been made and the counter reaches zero. Then the de-queuer 14 will clear the control entry from its queue. For VPLS packets, which require the aforementioned labels, the frame reader 16 will, while the control entry is being used to retrieve the packet data from the memory 13, access the VPLS label database 19 so that the required labels may be appended to the packet.

As indicated previously the label database requires proper management. A versatile and efficient method of memory management in the label memory has the following constraints:
1. It should not place any constraints on the HW state machines that read this memory.
2. It should not significantly reduce the configurability of VPLS labels for multicast groups.

More specifically, given the constraints above, the memory manager should support both the addition of a VPLS label to an arbitrary multicast group and the removal of a VPLS label from an arbitrary multicast group.

These preceding requirements in turn place the following detailed requirements on a memory manager of the label RAM used for VPLS label chains:
1. Addition of Labels
   (a) Allocate a label cluster, configure the first VPLS label entry in that cluster and link this newly allocated label cluster into an arbitrary VPLS Root Table Entry, being the only label cluster linked to that VPLS Root Entry Table.
   (b) Allocate a label cluster, configure the first VPLS label entry in that cluster and link this newly allocated label cluster into an existing linked list of label clusters (i.e. a chain) for an arbitrary VPLS Root Table Entry.
2. Removal of Labels.
   (a) Remove the last valid VPLS label from the last label cluster in the linked list of label clusters for an arbitrary VPLS Root Table Entry.
   (b) Remove a VPLS label (other than that indicated in the preceding paragraph) from any label cluster in the linked list of label clusters for an arbitrary VPLS Root Table Entry.

The following constraints are on the software developed to manage the label database.
1. There can be no packet replication/dropped during label data modification by software.
2. Relatively quick label insertion/extraction.
3. Update of labels requires two writes
4. Scan of chain is at hardware speed taking a maximum time of $T_{short}$.
5. Inflight references to label chains require a maximum of $T_{long}$ to make their way through the system.

In the following examples, each label cluster contains four labels (N=4); this is to allow pipelining in the HW processing of labels. The number of labels in a cluster is at the choice of the designer.

Each label cluster has a next-label-cluster-pointer, stored in label index [0] in a cluster.

In the following examples, the 'sentinel' is a specially reserved label cluster whose labels are all marked as invalid and whose next cluster pointer is pointing to itself All label clusters in the free pool of label clusters have their next-cluster-pointer pointing to the sentinel by default.

Only on return to the free pool can a label cluster's next-label-cluster-pointer be pointed to the Sentinel. Until then it may be used by arriving references.

Addition of the very first VPLS Label to Multicast Group N

Figure 1:
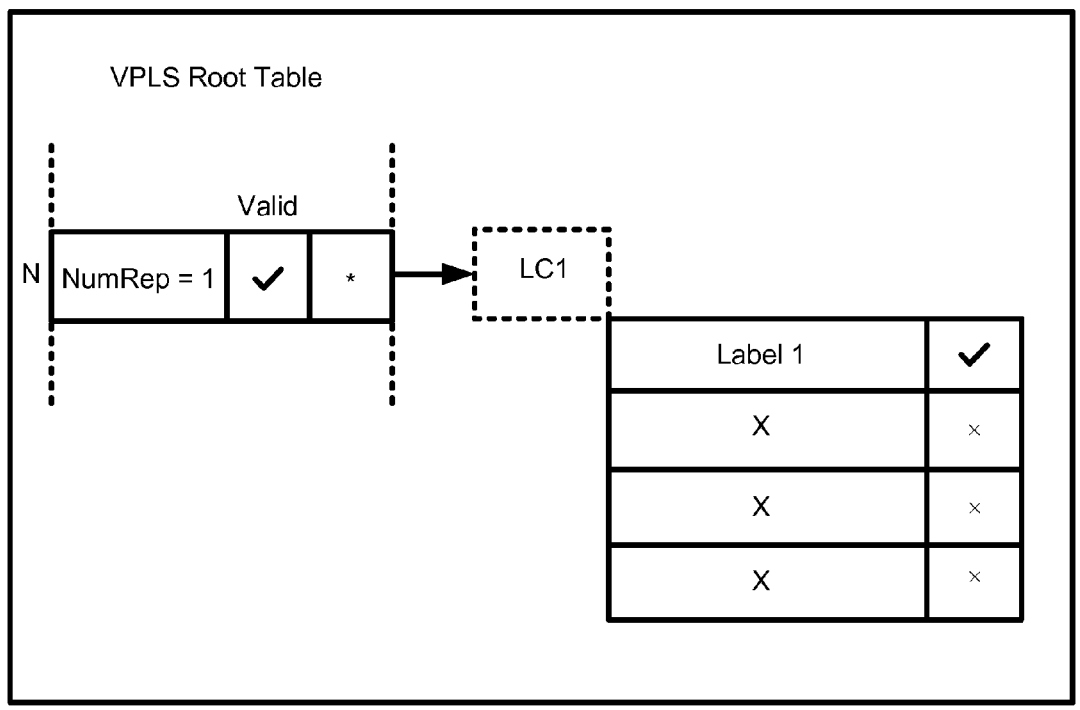
FIGS. 1 to 14 each illustrate schematically a VPLS root table and part of a label memory and each shows the performance of a particular stage in an exemplary technique according to example embodiments.

FIG. 1 illustrates the addition of a very first VPLS label to a multicast group. FIG. 1 shows the end of this process. In FIG. 1 there is shown a VPLS Root table which has NumRep (i.e. the number of replications) set to one. The validity field is set and the field marked (*) is a pointer to the respective label cluster LC1. To the right of FIG. 1 is the relevant section of label memory. Only one label is shown (Label 1) which has its validity field (a single bit) set to indicate a valid entry. Adjacent storage locations have their validity bits cleared, as shown by the (x).

The program steps are as follows.
1. Allocate a single label cluster LC1 from a pool of free label clusters. Mark all label entries as invalid.
2. Configure Label 1 within a label cluster LC1 with the required contents (and set its validity field (usually a single bit).
3. Set the VPLS Root Table Entry N Label cluster pointer to point to the newly allocated label cluster LC1.
4. Set NumRep of the VPLS Root Table entry to 1.
5. Set the validity bit of the VPLS Root Table entry.

Steps 3-5 should be performed 'atomically', i.e. such that there is no intervening time window in which a hardware or software access can produce an action which is inconsistent by virtue of occurring within that window.

The resulting configuration is shown in FIG. 1.

Figure 2:
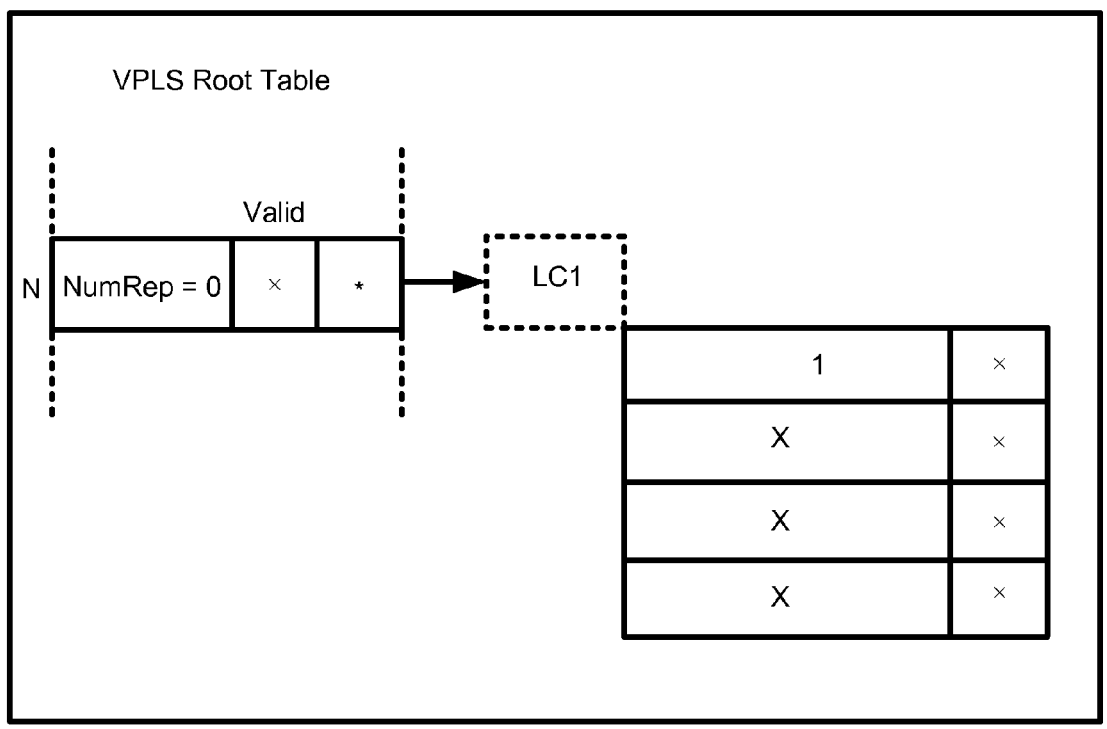

Removal of the Only VPLS Label of Multicast Group N (FIG. 2)

This process is a simple one because the removal will not cause any gap in the list of labels. The program steps are as follows
1. Clear the validity bit of Label 1 in label cluster LC1.
2. Decrement NumRep and clear the validity bit in the VPLS Root Table Entry N in one atomic operation.
3. Return the label cluster LC1 to the free pool via a pending queue. This allows an inflight time $T_{long}$ to elapse to prevent its reuse while in flight references to it are still present.

Note that any arriving inflight reference to Label 1 (from FIG. 1) now references a label whose validity flag is cleared.

Figure 3:
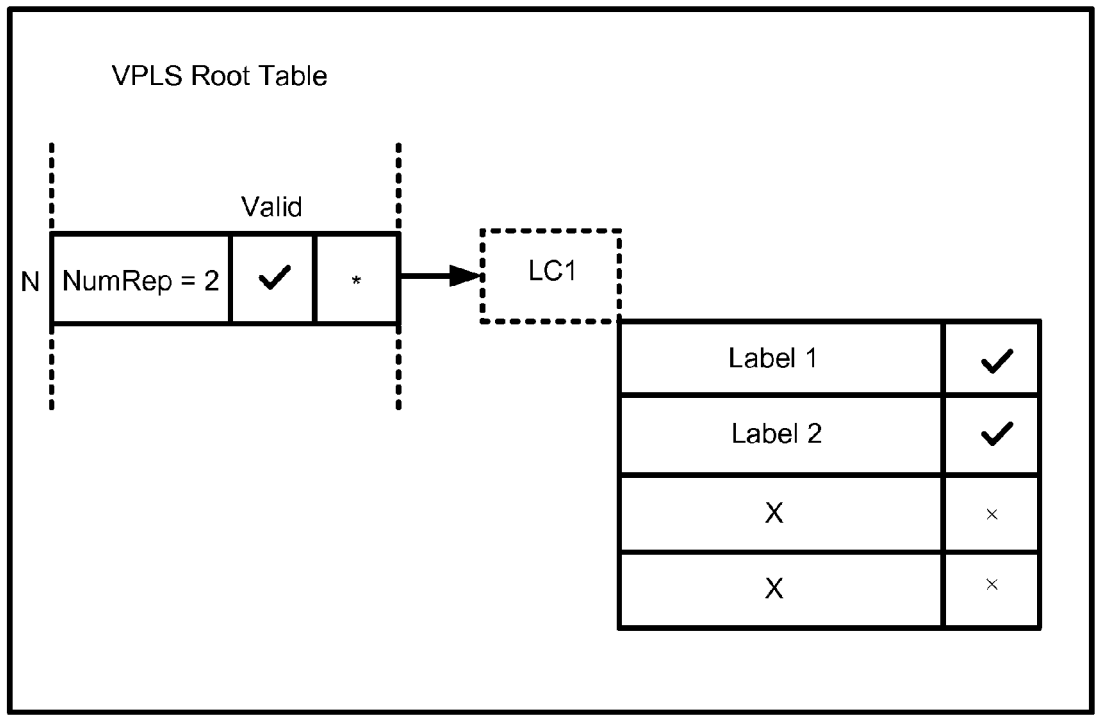

Addition of a second VPLS label to a Multicast Group N that contains one valid label (FIG. 3).

This process is again a simple one because it is necessary only to ensure that the new label is in a storage location adjacent that occupied by the existing label. The program steps are as follows.
1. Locate the label cluster LC1 with the last valid label (Label 1).
2. Configure label 2 within label cluster LC1 with the required contents (and set its validity bit(s).
3. Set NumRep of the VPLS Root Table entry to 2.

Figure 4:
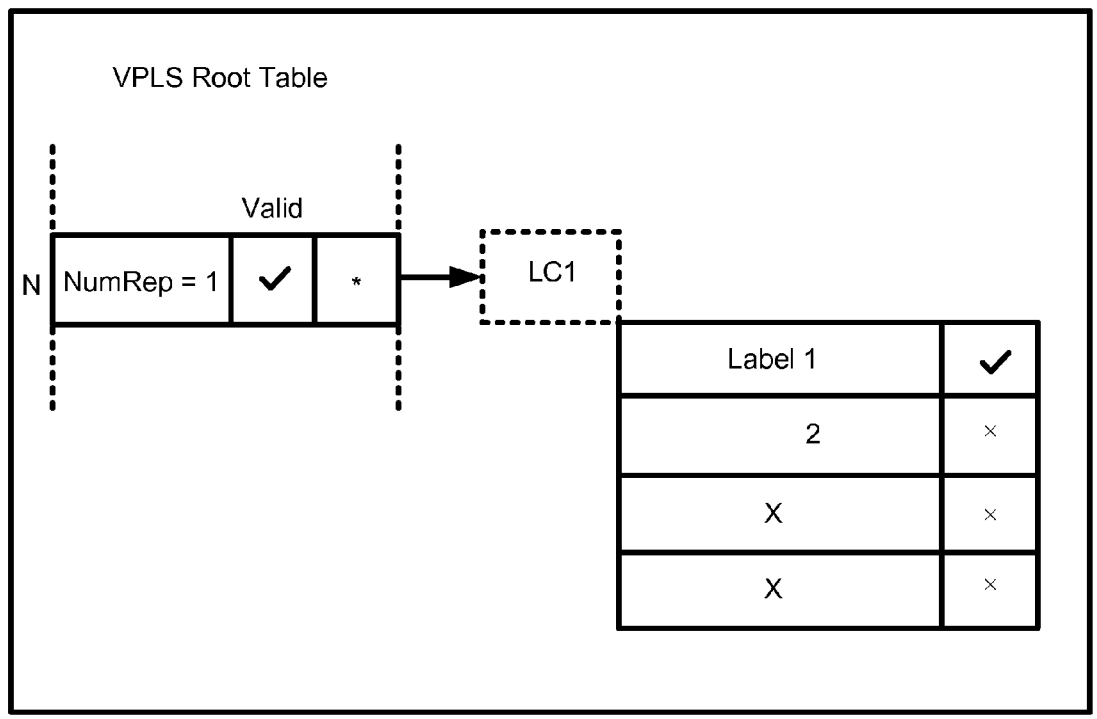

Removal of the Second VPLS Label from Multicast Group N that Contains Two Labels Only (FIGS. 3 and 4)

The starting configuration is shown in FIG. 3. The subsequent program steps are as follows.
1. Clear the validity bit of the Label 2 in label cluster LC1.
2. Decrement NumRep of the VPLS Root Table entry to 1. The resulting configuration is shown in FIG. 4.

This process is, like the preceding ones, easy because the removal of the last label does not occasion any gap.

Removal of the First VPLS Label from Multicast Group N that Contains Two Labels.

This is the first problem which is solved by the example embodiments, which removes the label without causing any gap. For the start configuration, see FIG. 3.

The program steps are as follows.
1. Locate the label cluster LC1 with the label to be removed (Label 1).
2. Clear validity bit for label entry Label 1 in cluster LC1.
3. Allocate a new label cluster LC2.
4. Copy all labels except the label to be removed from label cluster LC1 into label cluster LC2.
5. Set the VPLS Root Table Entry N label cluster pointer to point to label cluster LC2 and decrement NumRep (done atomically).
6. Return label cluster LC1 to the free pool via a pending queue which allows an inflight time $T_{long}$ to elapse to prevent its reuse while inflight references to it are still present.

Figure 5:
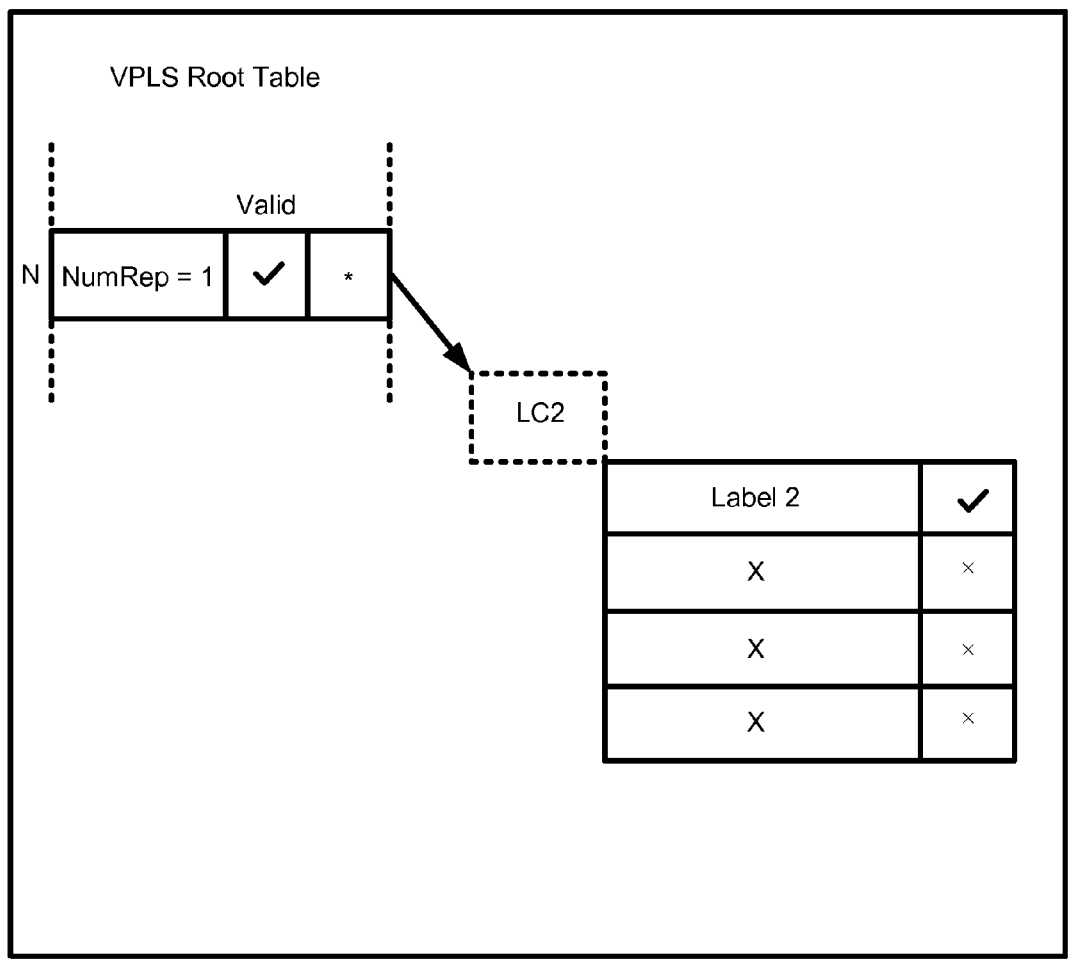

The resulting configuration is shown in FIG. 5.

Addition of a Fifth VPLS Label to Multicast Group N that is Full of Valid Labels i.e. Already Contains Four Valid Labels.

Figure 6:
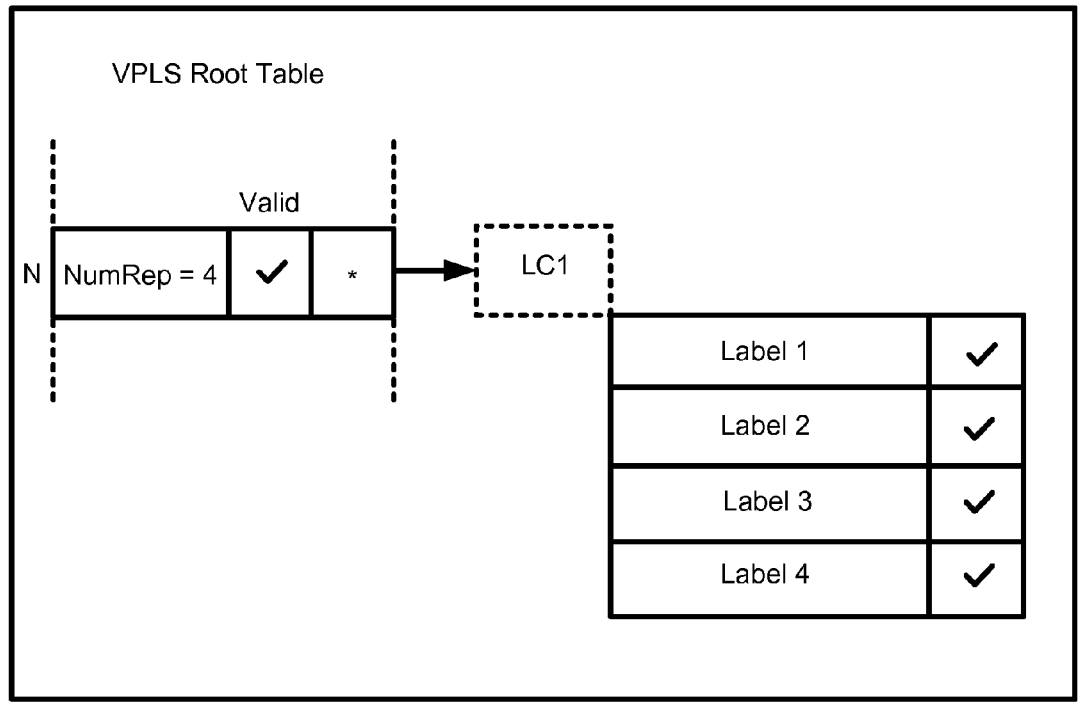

For the start configuration, see FIG. 6.
The program steps are as follows.
1. Allocate a new label cluster LC2 to contain the new label data Label 5.
2. Configure the first label entry of label cluster LC2 with the data for Label 5 and set its validity bit(s).
3. Set the next label cluster pointer of label cluster LC1 to label cluster LC2.
4. Set NumRep of the VPLS Root Table Entry to 5.

Figure 7:
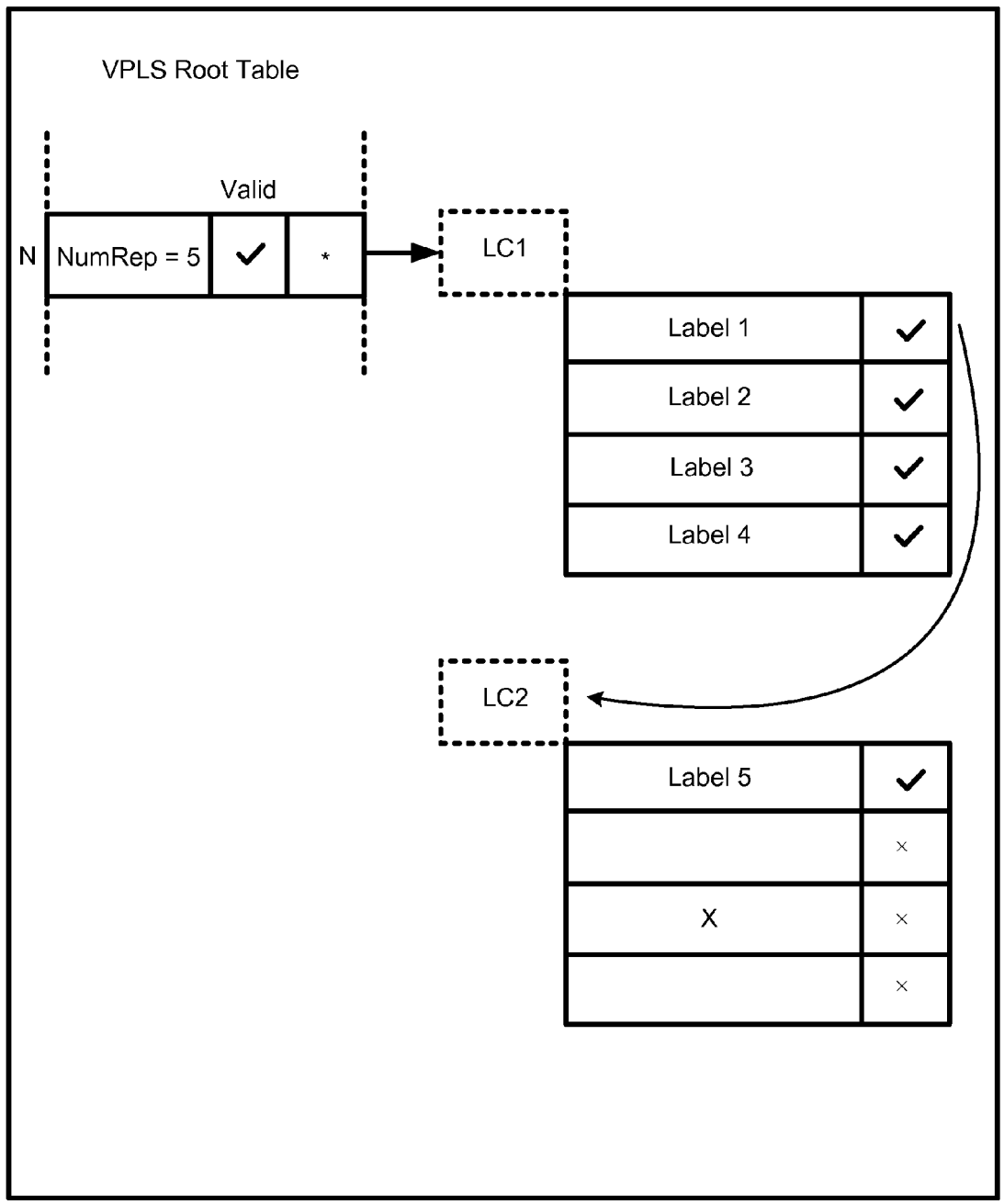

The resulting configuration is shown in FIG. 7.

It will be observed that this process of establishing a new label cluster and inserting it into the chain is a concomitant of the fixed size of a cluster.

Removal of a fifth VPLS label from a multicast group N that contains five valid labels.

For the start configuration, see FIG. 7.
The program steps are as follows.
1. Locate the label cluster LC2 with the label to be removed (Label 5).
2. Clear validity bit for label entry Label 5 in cluster LC2.
3. Point label cluster LC1's next cluster reference to the Sentinel.
4. Decrement NumRep of the VPLS Root Table Entry N to 4.
5. Return label cluster LC2 to the free pool via a pending queue which allows an inflight time $T_{short}$ to elapse to prevent its reuse while HW is still processing the label chain of label clusters LC1 and LC2.

Figure 8:
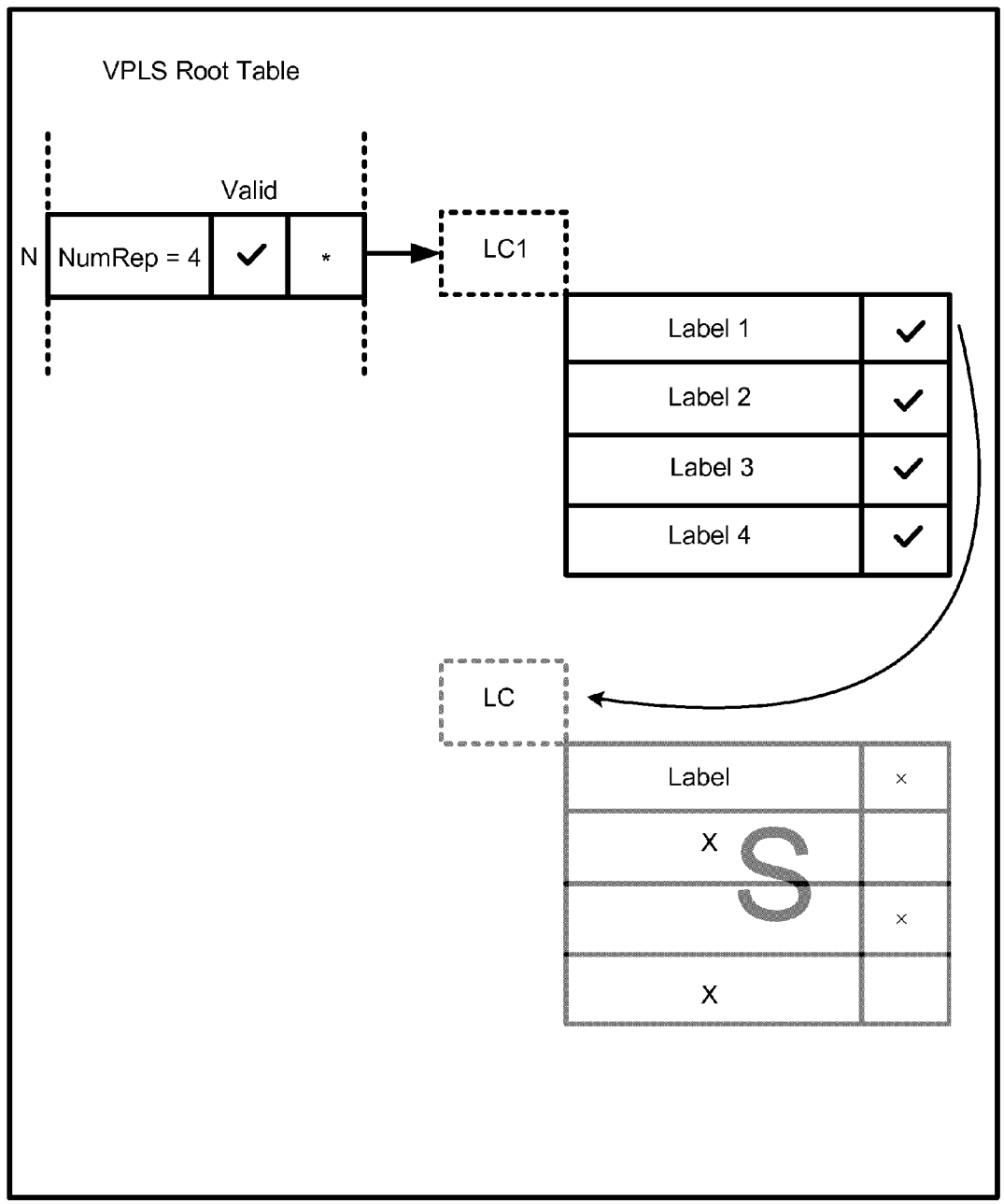

The resulting configuration is shown in FIG. 8.

Figure 9:
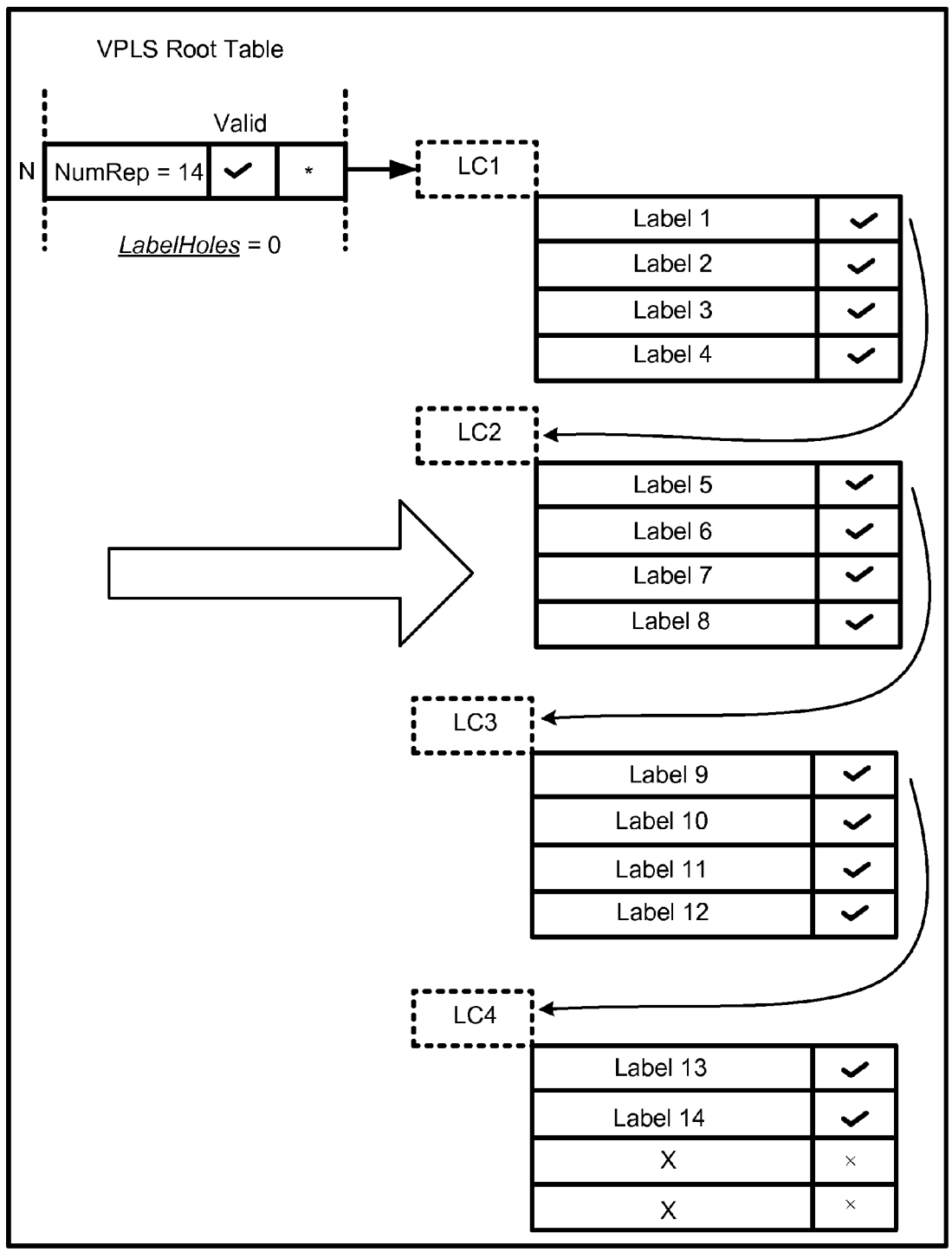

Removal of a label (Label 7 in FIG. 9) from a Multicast Group N that is in a middle label cluster in the label chain.

Figure 10:
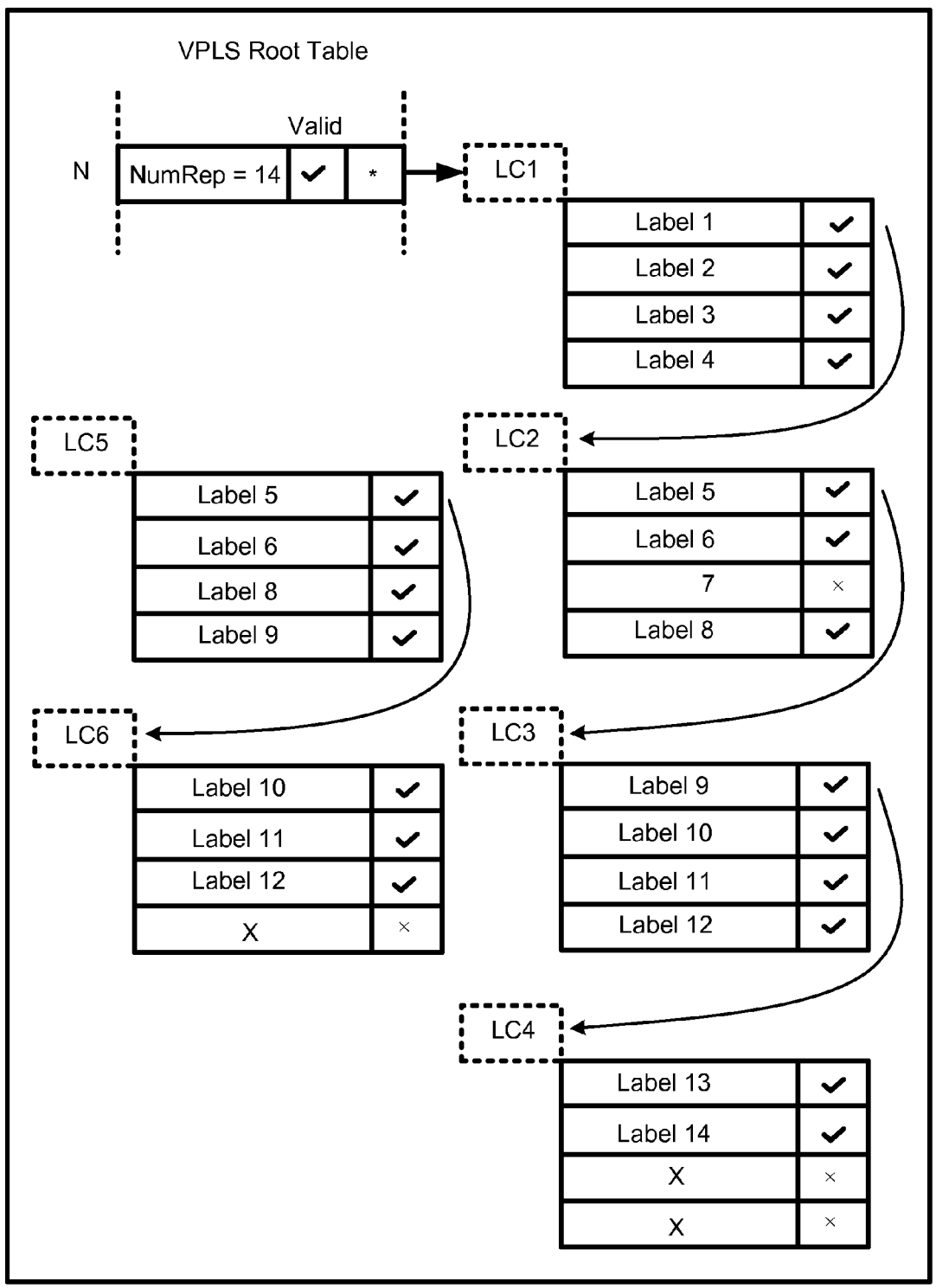
Figure 11:
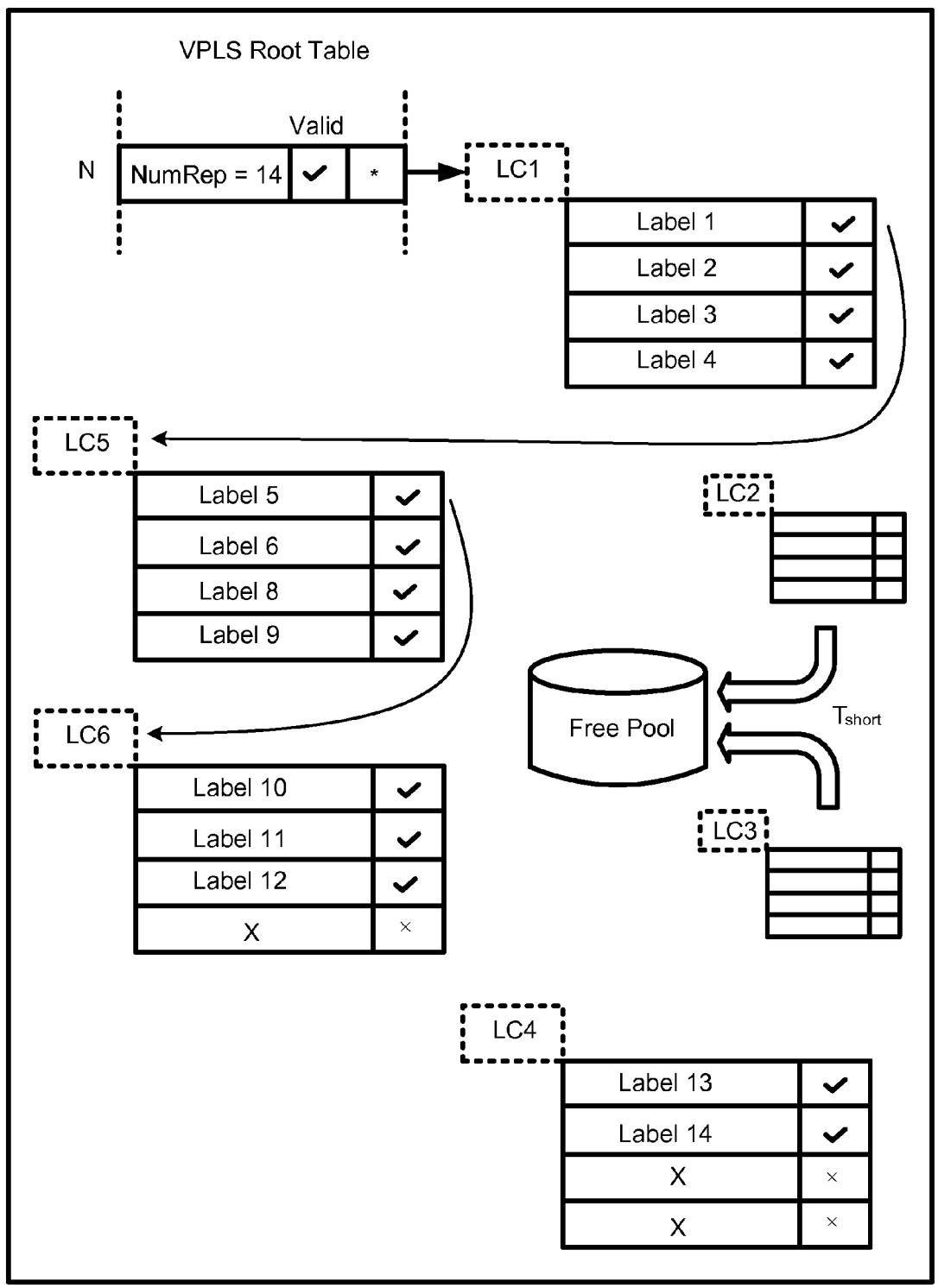
Figure 12:
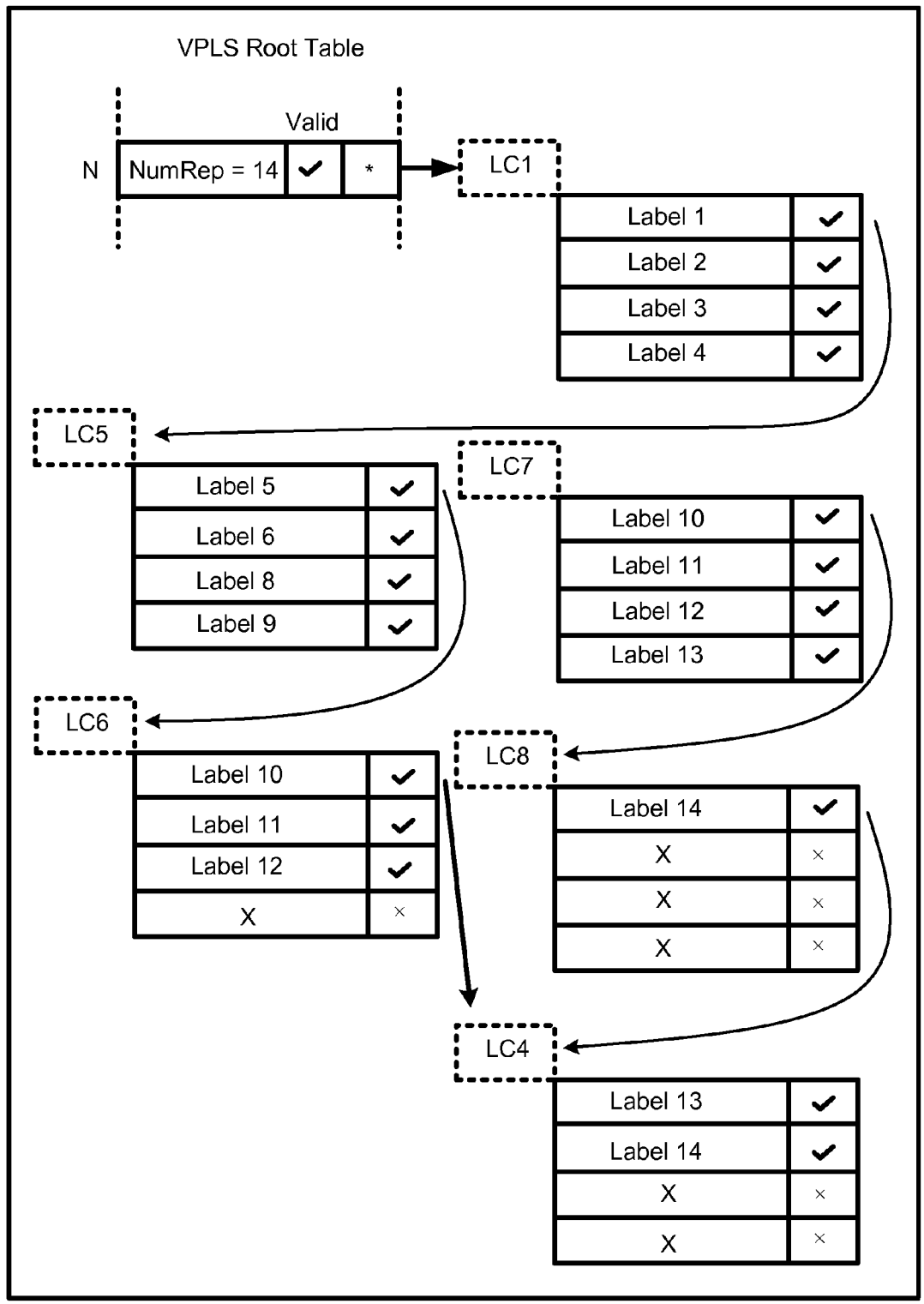

The program steps are as follows.
1. Locate the label cluster LC2 with the Label 7 to be removed.
2. Clear validity bit for Label 7.
3. Allocate two label clusters LC5 and LC6 from the free pool.
4. Copy all labels except Label 7 from the label clusters LC2 and LC3 into these two newly allocated label clusters LC5 and LC6. Link the next label cluster pointer from label cluster LC5 to label cluster LC6 and the next label cluster pointer of LC6 to label cluster LC4. This results in the configuration shown in FIG. 10.
5. Link the next label cluster pointer from label cluster LC1 to label cluster LC5.
6. Return label clusters LC2 and LC3 to the free pool after $T_{short}$, resulting in the configuration shown in FIG. 11.
7. Allocate label clusters LC7 and LC8 from the free pool.
8. Copy in valid labels from label clusters LC6 and LC4 into label clusters LC7 and LC8.
9. Link the next label cluster pointer of label cluster LC7 to label cluster LC8. The resulting configuration, to this point, is shown in FIG. 12.
10. Link the next label cluster pointer of label cluster LC5 to label cluster LC7.
11. Return label clusters LC4 and LC6 to the free pool after $T_{short}$.
12. Decrement NumRep of the VPLS Root Table Entry N to 13.

Figure 13:
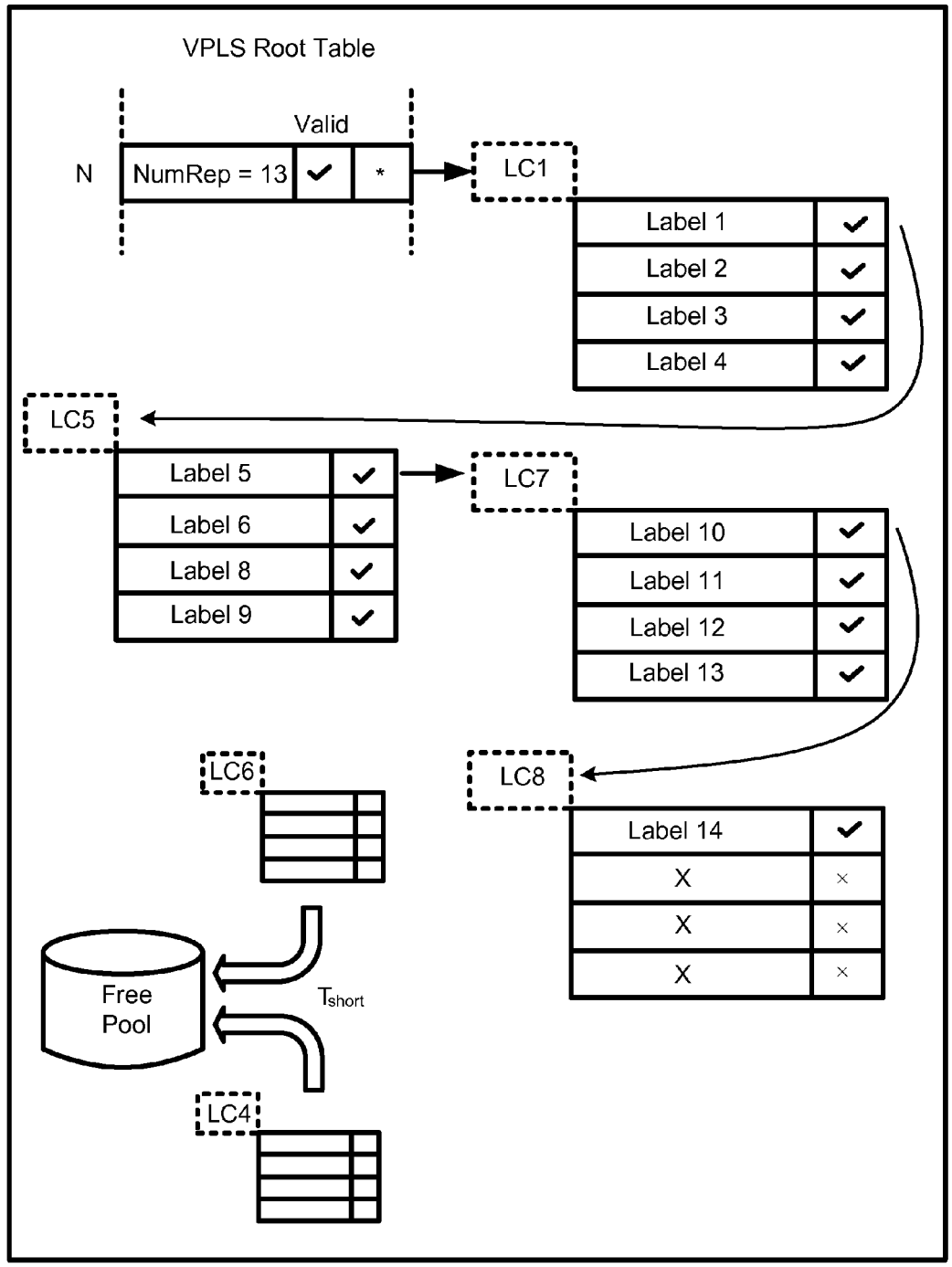

The resulting configuration is shown in FIG. 13.

This process employs a two-step process using LC7 and LC8. However, it is possible to create a new chain down to the last label in one set of operations.

Removal of a label (Label 3) in the first label cluster in a chain of label clusters from Multicast Group N.

Figure 14:
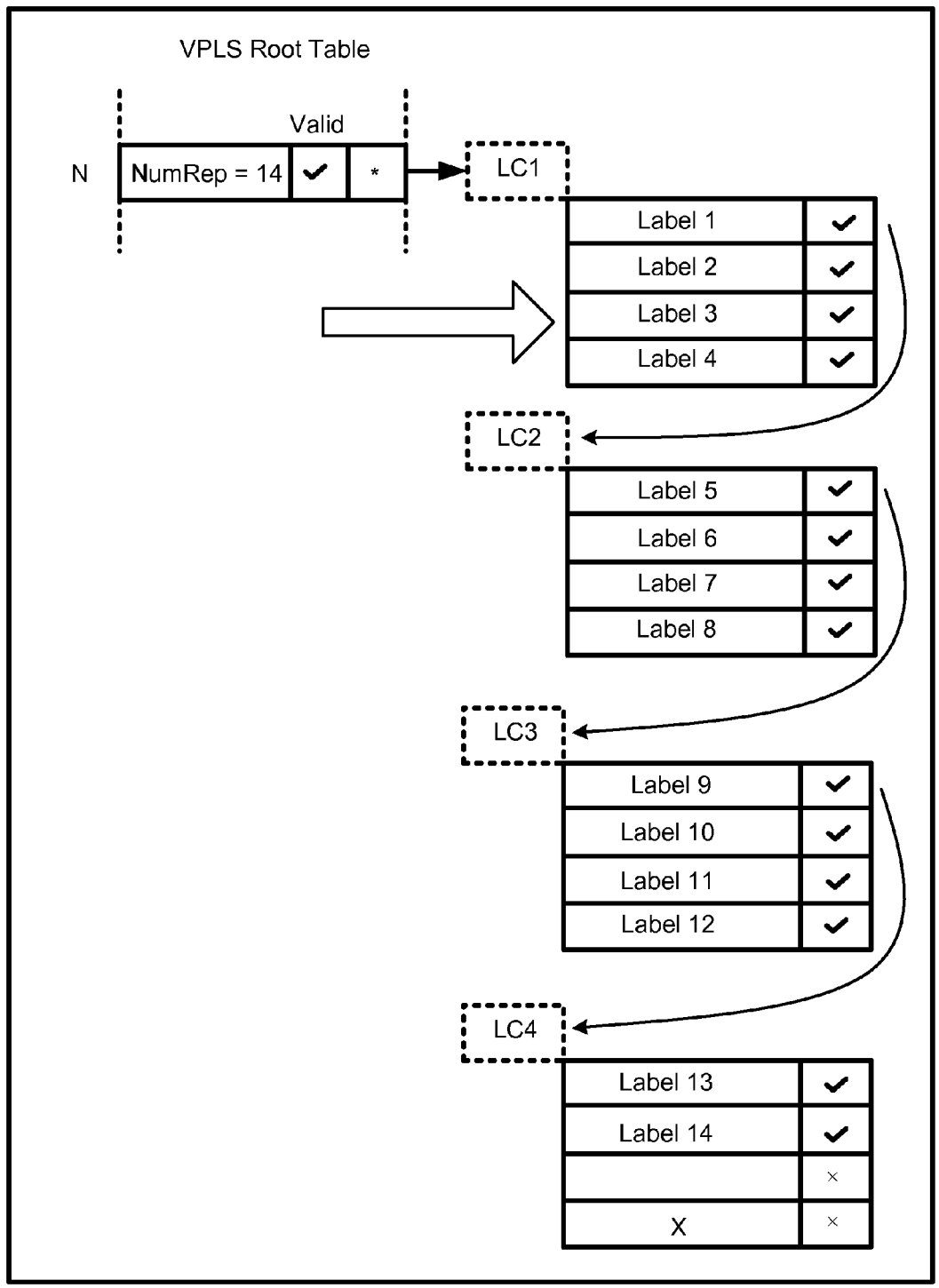

The program steps are as follows.
1. Locate the label cluster LC1 with the Label 3 to be removed as shown in FIG. 14.
2. Clear validity bit for Label 3.
3. Allocate two label clusters LC5 and LC6 from the free pool.
4. Copy labels except Label 3 from label clusters LC1 and LC2 into these two newly allocated label clusters LC5 and LC6. Link the next label cluster pointer from label cluster LC5 to label cluster LC6 and the next label cluster pointer of LC6 to label cluster LC3.
5. Write the VPLS Root Table Entry so that the label cluster pointer now points to label cluster LC5.
6. Decrement NumReps
7. Return label clusters LC1 and LC2 to the free pool after $T_{long}$.

The remaining steps follow the steps described with reference to FIGS. 9 to 13 with the exception that when subsequent label clusters are passed to the pending queue at $T_Y$, the time delay before they are returned to the free pool must be $T_{short}$ or $(T_X + T_{long} - T_Y)$, whichever is longer, where $T_X$ is the time at which label clusters LC1 and LC2 were passed to the pending queue.

The process of removal of a label may be modified to allow a fast 'logical' delete of a label before the chain copying process completes. A bit may be set such that the hardware will not replicate to the label. This expedient retains an ineffective label within the chain, but the retention is preferably temporary and the label should be removed if the memory usage is to be maximised.

The invention claimed is:
1. A method of managing a label data base including one or more label clusters, of which each entry in a label cluster comprises a label or data field for insertion into a respective packet in a multicast transmission and a validity field, the method comprising:
in a processor, executing the acts of:
(a) establishing a fixed size (N) for each of one or more label cluster, where (N) is a number of labels or data fields in each of the label clusters;
(b) associating with each label cluster a pointer to another label cluster;

(c) establishing a sentinel cluster of which all entries are indicated to be invalid and of which the cluster pointer points to this sentinel cluster;

(d) establishing a root table which defines the number of replications of the packet in a multicast group and identifies a first cluster associated with the multicast group; and (e) establishing a chain of label clusters of which each label cluster which is full of valid entries points to the next label cluster in the chain and the last label cluster which contains valid entries points to the sentinel cluster.

2. A method according to claim 1 in which the addition of a new label when said last cluster in the chain is full of valid entries comprises establishing a new label cluster with the new label as its first entry, and changing the cluster pointer for said last label cluster to point to the said new cluster.

3. A method according to claim 1 in which the removal of a given label from within a specified cluster comprises copying all the entries which are to be retained from said specified cluster and all subsequent clusters into a new chain of clusters in which all the clusters with the possible exception of the last cluster in the new chain are full of valid entries in order and setting the cluster's pointers so as to substitute this new chain in place of said specified and said subsequent clusters.

4. A network device including a label data base including one or more label clusters, of which each entry comprises a label or data field for insertion into a respective packet in a multicast transmission and a validity field, wherein the network device comprises:

a processor configured to:

(a) establish a fixed size (N) for each of one or more label clusters, where (N) is a number of labels or data fields in each of the label clusters;

(b) associate with each label cluster a pointer to another label cluster;

(c) establish a sentinel cluster of which all entries are indicated to be invalid and of which the cluster pointer points to this sentinel cluster;

(d) establish a root table which defines the number of replications of the packet in a multicast group and identifies a first label cluster associated with the multicast group; and (e) establish a chain of label clusters of which each label cluster which is full of valid entries points to the next label cluster in the chain and the last label cluster which contains valid entries points to the sentinel cluster.

5. A network device according to claim 4 and further configured for the addition of a new label when said last cluster in the chain is full of valid entries by (i) establishing a new label cluster with the new label as its first entry, and (ii) changing the cluster pointer for said last label cluster to point to the said new cluster.

6. A network device according to claim 4 and further configured for the removal of a given label from within a specified label cluster by (i) copying all the entries which are to be retained from said specified label cluster and all subsequent clusters into a new chain of clusters in which all the label clusters with the possible exception of the last cluster in the new chain are full of valid entries in order and (ii) setting the cluster's pointers so as to substitute this new chain in place of said specified and said subsequent clusters.

7. A network device according to claims 4 and comprising means for receiving a multicast data packet, means for obtaining a control entry denoting the packet, means for storing a payload of the packet, means for processing the control entry to obtain a multiplicity of secondary control entries each denoting a replication of the packet, and means for constructing for each secondary control entry a unicast packet including the payload and a respective label obtained from said label database.

* * * * *